UNITED STATES PATENT OFFICE 2,149,035

PROCESS FOR SWEETENING OF HYDROCARBON OILS

George Hugo von Fuchs and Lawson Elwood Border, Wood River, Ill., assignors to Shell Development Company, San Francisco, Calif., a corporation of Delaware No Drawing. Application February 19, 1937, Serial No. 126,648

1 Claim. (Cl. 196—24)

This invention relates to improvements in the treatment of hydrocarbon oils and more particularly to an improved process for sweetening and desulfurizing hydrocarbon distillates.

The process herein described is a continuation in part of our application Serial No. 574,920, filed November 13, 1931, now Patent No. 2,080,365.

The object of the invention, generally, is to provide a process whereby petroleum distillates, e. g., gasoline, naphtha, kerosene, furnace oils, and liquid and vapor phase cracked distillates, may be treated to desulfurize and sweeten the same, thereby producing a treated distillate having a good odor, negative doctor and negative corrosion tests, and a low gum content, as well as an improved color stability and antiknock value.

Broadly our process comprises treating the hydrocarbon distillate in the liquid phase and at substantially normal room temperature with an active copper reagent in the presence of a gaseous acidic activator to convert the mercaptans to copper mercaptides which are soluble in liquid hydrocarbons, and then removing the copper mercaptides from the distillate in any suitable manner.

Active copper reagents in the order of their activities are metallic copper in various forms, copper oxides and copper salts. In general, we prefer metallic copper not only because it appears to react faster than either the oxides or salts but also because at times it is capable of effecting sweetening when, under identical conditions, the oxides and particularly the salts are incapable of having this effect. Likewise oxides are superior to salts.

If metallic copper is employed, it is preferably used in a form which provides a large reacting surface, for example, in the form of turnings, filings, wool or powder. A particularly fine powder can often be obtained by precipitation from a solution of a copper salt, for instance, by reacting such a solution with a metal having a higher oxidation-reduction potential than copper.

The rate of reaction, i. e., the formation of copper mercaptides during the contact of the sour hydrocarbon solution with the copper reagent is greatly accelerated by the presence of certain gaseous accelerators, notably sulfur dioxide and hydrogen chloride. These gases are advantageously dissolved in the oil prior to contacting it with the copper reagent. While these particular accelerators have been found to give very satisfactory acceleration, in general, any oil-soluble material of strongly acidic nature, which has no harmful effect on the oil and which can be removed with sufficient ease after treatment may be used as an accelerator. On the other hand, hydrogen sulfide being very undesirable and harmful to the oil should be avoided, and besides it, as well as gases like carbon dioxide, having extremely low acidities, is incapable of materially accelerating the rate of copper mercaptide formation.

The presence of added water, although permissible, is frequently undesirable. When using a copper reagent which is insoluble in water, as metallic copper or copper oxide, water seems to reduce the rate of reaction materially, possibly because the metal surface is wetted by water more easily than by mercaptans, thereby making difficult the contact between the reacting surface and the mercaptans, mercaptans being substantially insoluble in water. Moreover, aqueous acids tend to decompose copper mercaptides to mercaptans and the copper salt of the acid, particularly at elevated temperatures, the degree of the decomposition being the result of a complicated equilibrium which depends, among other things, on the relative solubilities of the copper mercaptides in the hydrocarbon and aqueous phases, and the hydrogen ion concentration in the hydrocarbon phase. Copper mercaptides going in solution in the aqueous phase are immediately decomposed quantitatively to the free mercaptan and copper salt by a relatively strong acid. Therefore, if the solubility of the copper mercaptide in the aqueous phase is lowered as by the addition of a copper salt, for instance, copper chloride, an improved degree of sweetening may be obtained.

The presence of hydrogen ions in the hydrocarbon phase is attributable to the small amount of water dissolved therein, and since the amount of water in a given distillate at a certain temperature is constant, saturation being assumed, the hydrogen ion concentration in the hydrocarbon phase becomes a function of the strength and concentration of the acid. For this reason a strong aqueous acid will cause a greater degree of decomposition than a weaker one, and whereas the presence of strong aqueous acid usually precludes the complete sweetening, sweetening in the presence of aqueous sulfurous acid is in many instances possible, particularly at low temperatures, not substantially above normal atmospheric temperature.

Inasmuch as the solubility of water in hydrocarbons rises rapidly with increasing temperature, the harmful effect of the aqueous acids becomes increasingly noticeable at higher temperatures, these increases, however, being relatively smaller for the weaker acids than for the stronger ones. Sulfur dioxide, therefore has the advantage over stronger acids of a greater water tolerance, i. e., the amount of water which can be dissolved in the mercaptan solution without preventing sweetening is greater for sulfur dioxide than for stronger acids such as hydrochloric acid.

A further advantage of sulfur dioxide over other gaseous acids lies in the fact that it may be present in the oil as a residue from a preceding sulfuric acid treatment after removal of the acid sludge, usually no further accelerator having to be added. Under such conditions the oil is normally thoroughly dry, and therefore the danger of having an amount of water present which might prevent sweetening is exceedingly small. Moreover sulfur dioxide is a reducing agent which normally effectively prevents oxidation of copper mercaptides to disulfides in the absence of added oxidizing agents.

The small amount of water which is liberated during the formation of mercaptides as is shown in the illustrative equation below $$Cu_2O + 2RSH \rightarrow Cu_2(SR)_2 + H_2O$$

appears to be insufficient in most instances to prevent sweetening in the presence of sulfur dioxide, at least at relatively low temperatures, in the absence of added water.

Usually the formation of copper mercaptides, when accelerated by a gaseous accelerator of the type hereinbefore described, proceeds satisfactorily at substantially normal room temperatures, so that external heating becomes unnecessary. Relatively high temperatures being usually undesirable, for reasons afore explained and also because, in the absence of water, copper mercaptides sometimes tend to decompose to disulfides and copper, particularly in the presence of acids and certain corrosive metals, as iron, we limit the temperature of reacting the distillate with an active copper reagent to below about 200° F. and preferably below 150° F., sweetening being unsatisfactory at higher temperatures.

The copper mercaptides formed in this treating step are substantially soluble in hydrocarbon oil, so that they are carried away from the reaction zone. At room temperature they are quite stable and substantially resistant to hydrolysis with water, although not resistant to hydrolysis with aqueous acids as hereinbefore stated; alkaline hypochlorite solutions apparently do not affect them to any extent, and with free sulfur they react but very slowly. In this respect they differ greatly from lead mercaptides formed during doctor treatment. Free oxygen, however, may convert them at least partially to disulfides even at normal room temperatures. Since, however, disulfides are in general undesirable in that many of them may boil within the boiling range of the distillate under treatment and therefore are not separable by distillation thus preventing a reduction of the sulfur content, and, moreover, they adversely affect knock ratings and lead susceptibilities of gasolines, we normally prefer to operate under conditions substantially to prevent their formation, i. e., we carry out our process under non-oxidizing conditions and particularly in the absence of free oxygen.

At higher temperature the copper mercaptides are less stable. In the absence of oxygen, steam, acids and alkalies, they can be heated to about 350° F. without material decomposition, a property which make possible the separation of the mercaptides from the distillate by distillation below 350° F. The presence of acids or alkalies, however, especially in combination with steam, greatly accelerates the decomposition at temperatures above about 200° F., particularly in contact with metals which are subject to corrosion, such as iron and steel.

Upon distillation, under conditions to avoid decomposition, mercaptan sulfur remains in the residue, and the overhead product has a considerably reduced sulfur content, is normally sweet to the doctor test, and has a pleasant, agreeable odor. Many of the sulfur compounds which do remain in the overhead product can be removed readily by sulfuric acid treatment.

Copper mercaptides may also be removed from the distillate solution by sulfuric acid treatment, mercaptides from cracked distillates being readily removed by ordinary concentrated sulfuric acid, whereas straight run mercaptides may require fuming sulfuric acid.

If the presence of disulfides in the treated distillate is not objectionable, oxidation methods may be employed to remove the copper mercaptides. While under many conditions we do not prefer such methods for reasons hereinbefore pointed out, yet oxidation methods are simple and effective, if properly carried out. A convenient oxidation method for removing the copper mercaptides is by treatment with ferric chloride. The ferric chloride may be used in the anhydrous or hydrated form or in an aqueous solution. It may act as a coagulator for the mercaptides causing their precipitation, or it may act as an oxidizing reagent, effecting conversion of the mercaptides to disulfides according to equations of which the following is an illustration:

$$2 FeCl_3 + Cu_2(SR)_2 \rightarrow FeCl_2 + Cu_2Cl_2 + S_2R_2.$$

While anhydrous ferric chloride is predominantly a precipitating agent, aqueous ferric chloride is predominantly an oxidizing agent.

The velocity of the oxidation reaction with aqueous ferric chloride depends largely on its concentration. At low concentrations, the presence of relatively large proportions of free aqueous hydrochloric acid, liberated from the chloride by hydrolysis, tends to decompose the copper mercaptides in the manner hereinbefore described, so that sweet distillate cannot be obtained. The minimum concentration of ferric chloride necessary to effect sweetening of the copper mercaptide solution depends to some extent on the type of distillate to be sweetened and is easily determined experimentally in each individual case.

As shown in the last equation the used ferric chloride solution contains some ferrous chloride and copper chloride. This ferrous chloride can be reconverted to ferric chloride by oxidation, for instance with air, and the copper chloride, after it has reached a certain concentration, can be exchanged for iron chloride by contact with metallic iron such as steel wool, scrap iron, iron filings, etc., whereby iron goes in solutions and the copper is precipitated in metallic form and can be used to contact sour distillate.

The distillate resulting from the ferric chloride treatment is advantageously distilled, whereby a sweet product of low gum content and high color stability is obtained.

A further method of sweetening sour distillates consists of mixing finely divided copper such as precipitated copper with clay and passing through this treated mixture a sour gasoline containing an accelerator, such as hydrogen chloride or sulfur dioxide gases. This particular method of treating is well adapted for the sweetening of cracked gasolines.

The following example serves to illustrate our process:

Sour straight run Hendricks gasoline of a sulfur content of .185% was treated with 5 lbs./bbl. 93% sulfuric acid. One portion of the acid treated gasoline containing a mere trace of $SO_2$, and thus being practically free from accelerator, was agitated with copper powder at ordinary room temperature. Some of the mercaptans were slowly converted to mercaptides, which were precipitated with ferric chloride. However, the resulting gasoline remained sour.

The same gasoline was treated with 100% sulfuric acid, which introduced into it a slightly greater amount of $SO_2$. The sludge was removed and two portions of the sludge-free gasoline were contacted with copper wool or red copper oxide. After precipitation of the mercaptides with ferric chloride, both portions of the gasoline were sweet.

It was noted that the conversion of mercaptans to mercaptides was complete in about three minutes.

We claim as our invention:

In a process for removing mercaptans from a hydrocarbon liquid containing same, the step of treating said hydrocarbon liquid in the liquid state at a temperature below 200° F. with metallic copper in the presence of a small amount of $SO_2$ in the absence of sulfuric acid.

GEORGE HUGO VON FUCHS.
LAWSON ELWOOD BORDER.